Jan. 29, 1924.  1,482,158
T. SHIPLEY
WATER MEASURING AND FEEDING DEVICE FOR CAN ICE PLANTS
Filed June 1, 1923   3 Sheets-Sheet 1

Inventor
Thomas Shipley
by Dodge and Sons
Attorneys

Jan. 29, 1924.

T. SHIPLEY 1,482,158

WATER MEASURING AND FEEDING DEVICE FOR CAN ICE PLANTS

Filed June 1, 1923    3 Sheets-Sheet 2

Inventor
Thomas Shipley
by Dodge & Sons
Attorneys

Jan. 29, 1924.
T. SHIPLEY
1,482,158
WATER MEASURING AND FEEDING DEVICE FOR CAN ICE PLANTS
Filed June 1, 1923      3 Sheets-Sheet 3
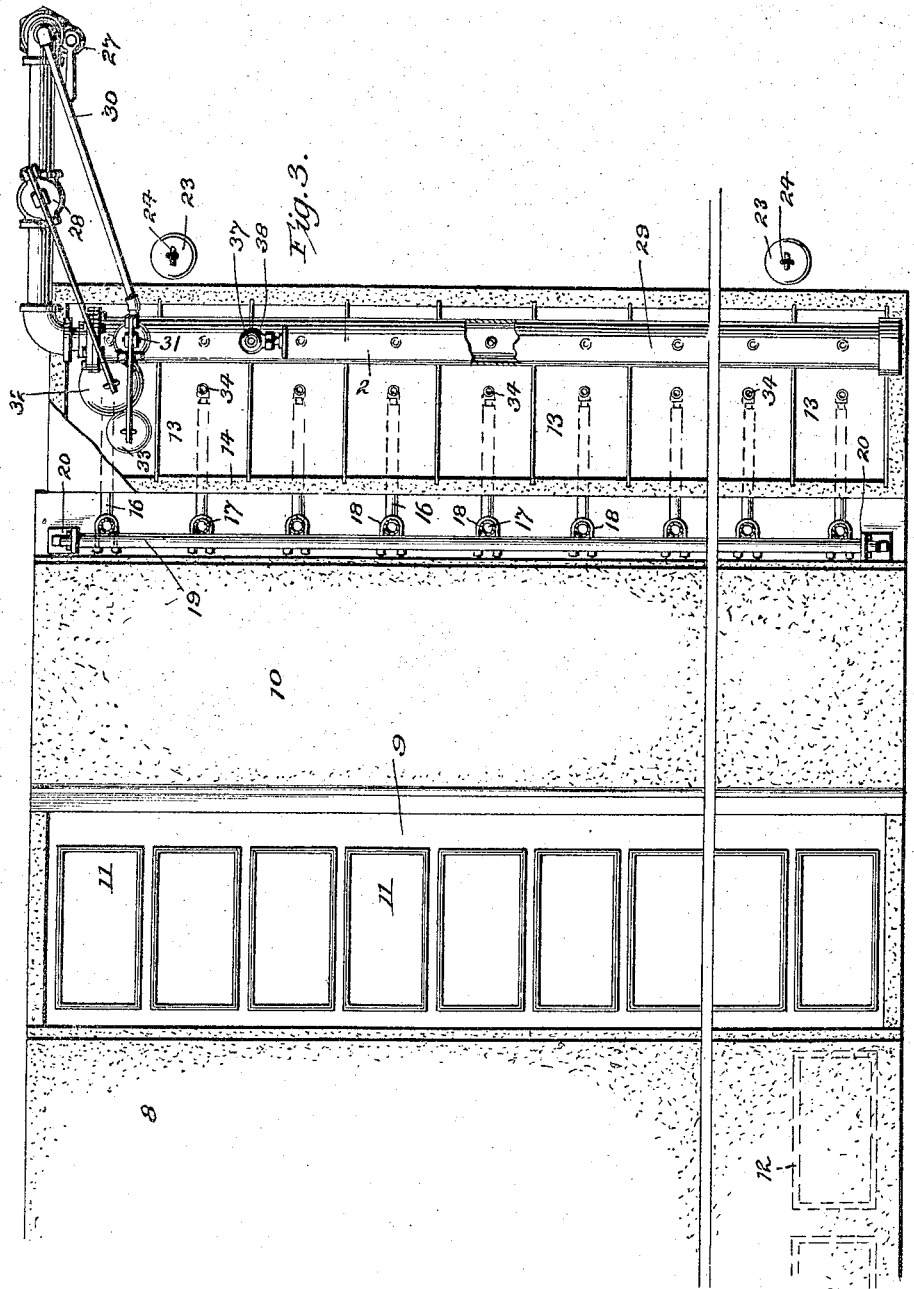

Patented Jan. 29, 1924.

1,482,158

UNITED STATES PATENT OFFICE.

THOMAS SHIPLEY, OF YORK, PENNSYLVANIA.

WATER MEASURING AND FEEDING DEVICE FOR CAN ICE PLANTS.

Application filed June 1, 1923. Serial No. 642,797.

*To all whom it may concern:*

Be it known that I, THOMAS SHIPLEY, a citizen of the United States, residing at York, in the county of York and State of Pennsylvania, have invented certain new and useful Improvements in Water Measuring and Feeding Devices for Can Ice Plants, of which the following is a specification.

This invention relates to liquid measuring devices, and particularly to a device for measuring precooled water and delivering it into the freezing cans used in can ice plants.

In large modern plants it is desirable, and sometimes absolutely necessary, to fill a large number of cans simultaneously, and it is highly desirable, for practical reasons connected with storage and sale, that the ice cakes be uniform in size.

Since the water is artificially cooled nearly to the freezing point, it is highly desirable that the water be measured and delivered rapidly, while operating conditions are such as to require a simple rugged device having a minimum number of valves and other moving parts.

The invention provides a device which is simple to operate, inexpensive to construct, and remarkably accurate in its measuring function. The level in one measuring tank controls the flow to all, and the main feeding header is so arranged as to equalize the levels in all the measuring tanks, as the tanks approach filled condition.

Particular embodiments of the invention are illustrated in the accompanying drawing in which:

Fig. 3 is a section on the line 3—3 of Fig. 1;

Fig. 4 is a fragmentary view showing a modified form of flow controlling valve.

Figure 1:
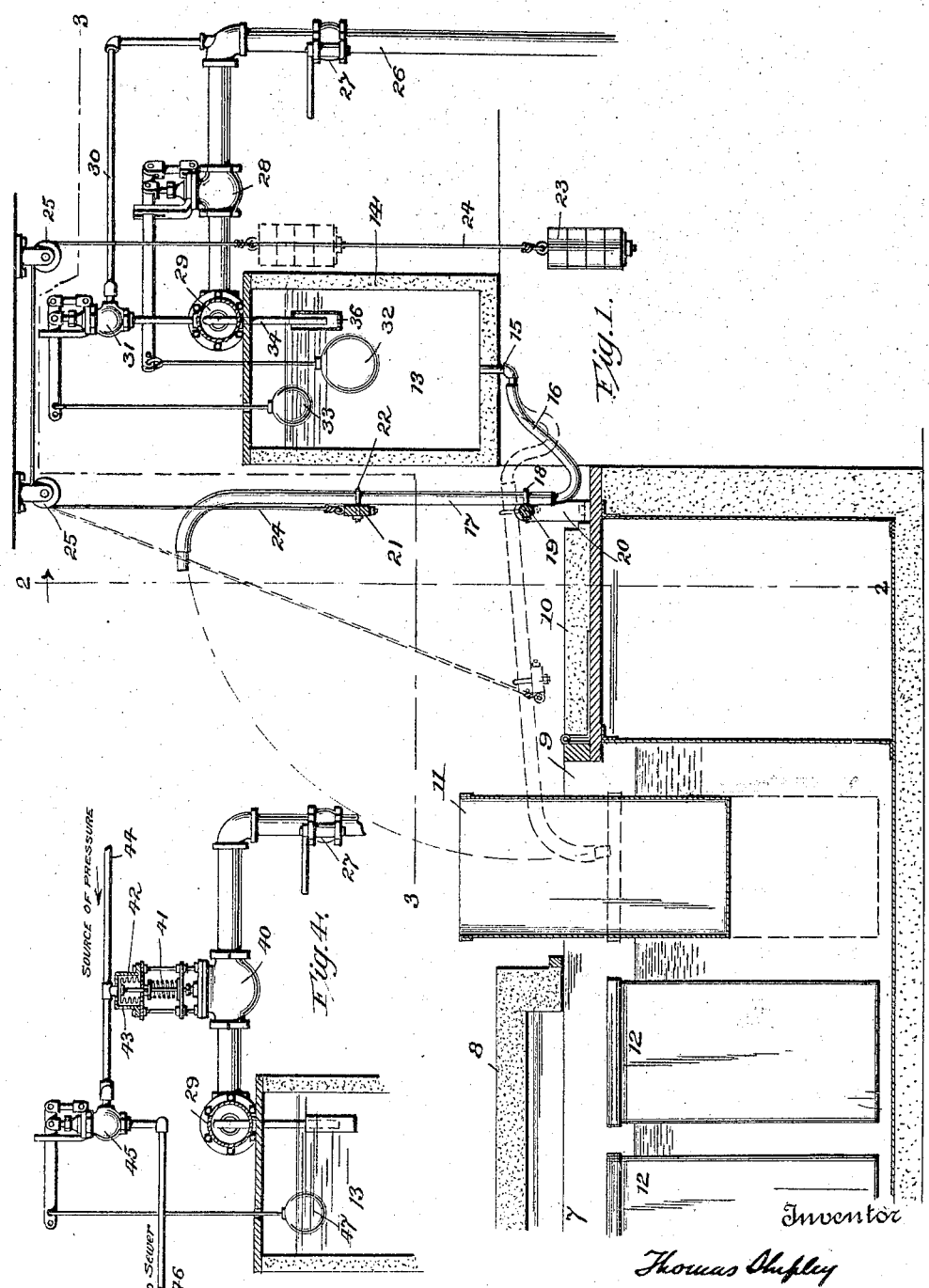
Fig. 1 is a vertical transverse section, the plane of section being taken through the level controlling tank.
Figure 2:
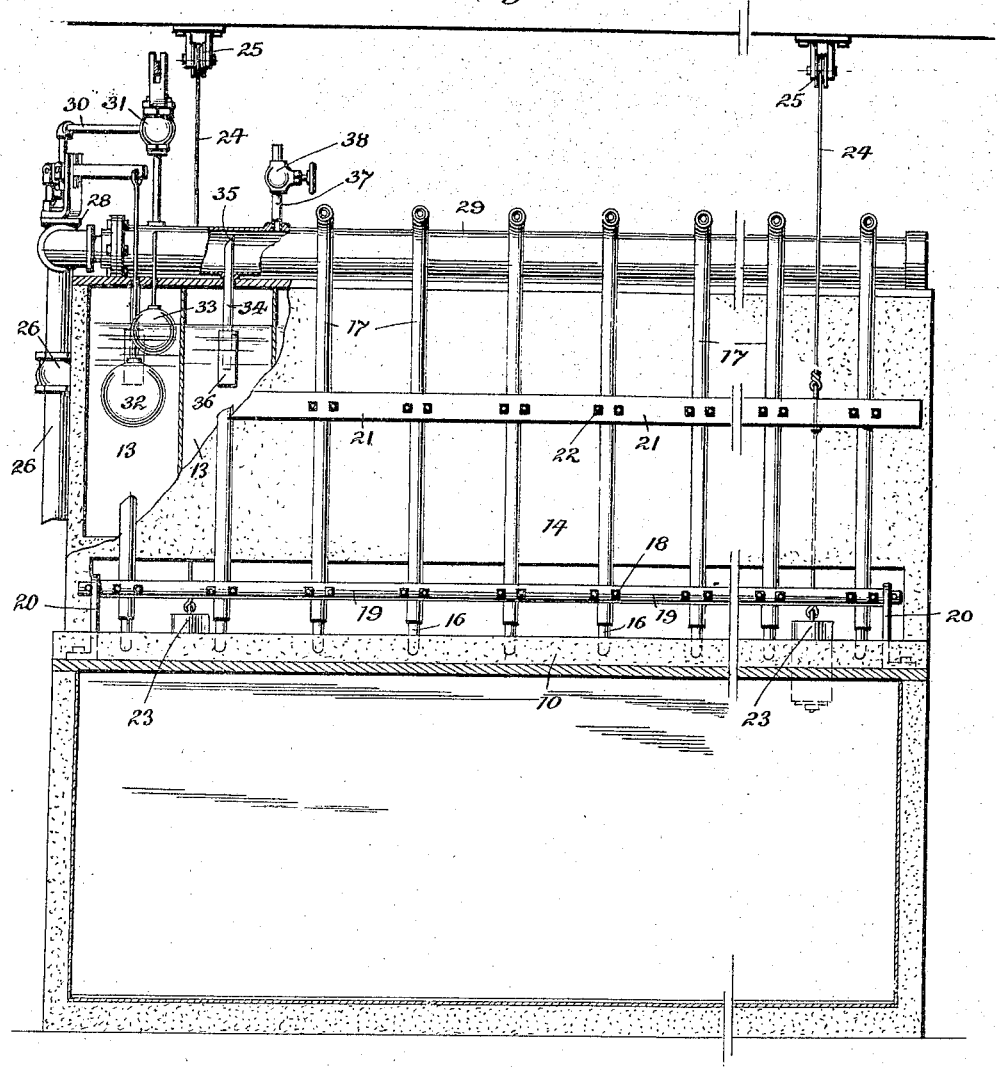
Fig. 2 is a section on the line 2—2 of Fig. 1.

Referring first to Figs. 1, 2 and 3, I have chosen for illustration a can ice plant of the pusher type, that being the field of use to which my invention is most particularly adapted.

The can filling end of the brine tank is indicated at 7. This tank is covered by an insulated deck 8 and is provided with a filling opening or hatch 9, which extends the width of the tank and which may be closed by a series of insulated doors 10.

The empty cans are inserted through the hatchway 9 and as they are filled they settle into the brine in the tank 7. When filled, the cans are pushed one can space away from the head end of the tank by a pusher structure (not shown) as is familiar to those skilled in the art. A row of cans in the filling position is illustrated at 11, while the filled cans are shown at 12. It is understood, of course, that when the cans arrive at the opposite end of the tank they are withdrawn and dumped.

In order that the doors 10 may be kept closed most of the time and in order to assure uniform freezing of the water in all the cans forming the successive transverse rows in the tank, it is desirable that the cans be filled at once. Consequently, I provide a plurality of measuring chambers 13, one for each can to be filled. All of these measuring chambers 13, with the exception of one end chamber, are of equal dimensions so that when filled to uniform level they will all contain equal quantities of water. The exception referred to is that chamber 13 which contains the float mechanism hereinafter described, the volume of this chamber being slightly increased to compensate for the submerged volume of the float or floats.

The external walls of these chambers are insulated as indicated at 14 and each chamber is provided with an outlet nipple 15 to which is connected a flexible hose 16, which hose 16 extends through and to the end of a corresponding supporting pipe 17. All of the pipes 17 are held by clips 18 to a horizontal supporting bar 19, which turns in brackets or bearings 20. The various pipes 17 are further connected together by a rail 21 fastened thereto by clips 22 so that all of the pipes may be swung up and down on the shaft 19 as a unit. Counterweights 23 are connected by cords 24 to the rail 21, the cords 24 passing over suitably arranged guide pulleys 25.

In the upper or vertical position of the pipes 17, the discharge ends of the hose 16 are above the water level in the measuring chambers 13. In the lower or approximately horizontal position the pipe 17 supports the ends of the hose 16 in a position below the bottoms of the measuring chambers 13 and hence serve to drain the latter.

The counterweights 23 are so chosen that while they are adequate to retain the pipes 17 in their vertical position, they do not completely counterbalance the turning moment exerted by these pipes as they approach their horizontal position. Consequently, by drawing the pipes 17 down so that they rest upon the tops of empty or partly filled cans, they will sink with the cans as the latter are filled.

Where very large numbers of measuring chambers 13 are used, it is impracticable to connect all of the pipes 17 to move as one unit. In such cases they may be arranged in two or more units, all the pipes of each unit being connected together.

The water for filling the measuring chambers 13 is brought from the pre-cooler (not shown) through a pipe 26 to a quick opening manually operated gate valve 27, thence it flows through a main float valve 28 to a relatively large horizontal header 29. This header extends horizontally over the series of measuring chambers 13. A by-pass connection 30 leads to the header 29 past the valve 28 and is itself closed by a secondary float valve 31. The float 32 of the main float valve 28 and the float 33 of the secondary float valve 31 are in one of the measuring chambers 13 and as already suggested, this chamber is given a slightly greater volume to compensate for the displacements of the floats 32 and 33.

The float valves 28 and 31 may be of any type in which the rise of the float shuts the valve. The particular valves shown in the drawing are of the balanced type in which the valve member moves upward to close, which is the reverse of the more familiar arrangement using ordinary unbalanced valves.

The float 32 is so set that it closes the valve 28 in advance of the closing of the valve 31 by its float 33. The header 29 discharges into each of the measuring chambers 13 by means of a corresponding one of a series of nipples 34. The nipples 34 are beveled at their upper ends as shown at 35 and are threaded through the lower wall of the header 29. They extend vertically upward and across the header into contact or substantially into contact with its upper wall. This is to prevent the nipples 34 from draining the header 29 after the float valves have closed.

Each nipple 34 is provided at its lower end with a trap or air seal consisting of a cup 36 into which the lower end of the nipple 34 dips. This cup 36 serves to maintain a water seal around the lower end of the nipple and is suspended from the nipple in spaced relation thereto.

A vent connection 37 with a valve 38 is provided at the top of the header 29 but the presence of this vent connection is optional.

Assuming that a row of cans has just been filled, the sequence of operation is as follows:

The pipes 17 are swung to vertical position and are retained there by the counterweights 23. The valve 27 which was closed while the measuring chambers 13 were being emptied may now be opened.

Since the chambers 13 are empty, the floats 32 and 33 are in the lowermost position and the valves 28 and 31 are open. Precooled water therefore flows through the valve 27 and valves 28 and 31 to the header 29, and discharges from this header through the various nipples 34 into the corresponding measuring chambers 13. All of these chambers will fill at substantially equal rates and as the chambers approach full condition, float 32 will be raised and will gradually close the valve 28. After the valve 28 has closed, the valve 31 will remain open so that water will continue to flow at a comparatively slow rate to the header 29.

As the level rises in the chambers 13, the ends of the nipples 34 will be submerged in the water in the corresponding tank and the feed of water through the nipples 34 will be faster to those chambers in which the level is low than to those chambers in which it is comparatively high, because of a slightly greater siphon head. Consequently, as soon as the ends of the nipples 34 are submerged equalization of level in the various chambers 13 commences and this equalization may continue even after the valve 31 has closed. Indeed, this equalization of level may result in alternate opening and closing of the valve 31 for a short period of time, before a condition will finally be reached when valve 31 is closed and the level in all the measuring chambers 13 has equalized. At this time the valve 27 is closed. If desired, the valve 38 may be opened to destroy the siphon and drain that part of the header above the upper ends of the nipples 35, but I have found in practice that this action is not strictly necessary though it tends to a little more accurate measurement.

After closing the valve 27, the pipes 17 may be swung down to empty the measuring chambers into corresponding ice cans. The valve 38 is now closed, if previously opened. The pipes 17 are swung to vertical position and the valve 27 is again opened initiating a repetition of the cycle just described.

Instead of using two float valves, I may, as illustrated in Fig. 4, substitute for them a diaphragm valve 40 which controls the flow of water from the valve 27 to the header 29. This valve is urged open by a coil spring 41 and may be forced closed against the opposition of the spring 41 by fluid pressure acting against a diaphragm 42 housed in a chamber 43. The pressure fluid, which may be derived from any suitable source, but which conveniently is water from the usual city mains, reaches chamber 43 through a pipe 44 and its effective pressure is controlled by means of a float valve 45 which opens or closes a waste connection 46. The valve 45 is controlled by a float 47 in one of the measuring chambers 13, and the parts are so arranged as the level in this chamber 13 rises, the valve 45 closes.

Until the measuring chamber 13 is nearly full, the float 47 is in its lowermost position and the valve 45 is wide open relieving the chamber 43 of fluid pressure and permitting the spring 41 to hold valve 40 wide open. When the water in chamber 13 begins to lift the float 47, the valve 45 will start to close gradually and will produce a gradually increasing pressure on the diaphragm 42 which will result in the closure of the valve 40. The valve 40 moves from full open to full closed position in a few seconds after its closing movement starts. Consequently, during the level equalizing period the valve is opened and closed at short intervals by float 47 and valve 45, giving a similar effect to that produced by gradual closure.

The important feature of the invention is the control of the flow of water to all the measuring chambers by a level controlled mechanism responsive to the level in one chamber and the equalization of level in the various chambers through the water feeding header.

If the tops of the water seal cups 36 on the nipples 34, which mark the effective discharge levels of the nipples, are only slightly below the maximum levels in the corresponding measuring chambers, then the equalizing siphoning action will occur only when the measuring chambers are substantially full and will cease almost immediately after the emptying of the measuring chambers commences. This precludes any inaccuracy such as might be introduced if one measuring chamber discharged more rapidly than others and thus tended to draw water by siphonic action from such others.

Obviously, the higher the discharge points of the nipples 34, the later in the filling operation will be the commencement of the equalizing siphonic flow. This requires a longer period for equalization to occur. Where it is desired to shorten this period of equalization, I lower the discharge point of the nipples 34 and prevent any siphoning from one chamber 13 to another during the emptying of such chambers by opening the vent valve 38 to destroy the siphon. Consequently, the presence of the vent valve 38 is necessary only in those cases where the discharge point of the nipples 34 is considerably below the maximum level of the corresponding measuring chamber.

What is claimed is:

1. In a liquid measuring device, the combination of a plurality of measuring chambers; controllable means for discharging liquid from said chambers; a header connected with each of said chambers near to but slightly below the maximum liquid level therein, whereby the header serves as a level equalizing connection when the chambers are substantially full; and means controlled by the level of liquid in one of said chambers serving to control the supply of liquid to said header.

2. In a liquid measuring device, the combination of a plurality of measuring chambers; controllable means for discharging liquid from said chambers; a header sufficiently large to supply liquid to all said chambers, provided with individual connections leading from the top of the header to the interiors of corresponding chambers, near to but below the maximum liquid level therein; and means, controlled by the level of liquid in one of the said chambers, serving to control the supply of liquid to said header.

3. In a liquid measuring device, the combination of a plurality of measuring chambers; controllable means for discharging liquid from said chambers; a header connected with each of said chambers near to but slightly below the maximum liquid level therein, whereby the header serves as a level equalizing connection when the chambers are substantially full; and a float controlled valve structure subject to the liquid level in one of said chambers, constructed and arranged to reduce the flow of liquid to the header as the level in said chamber approaches, and to terminate such flow as said level reaches the desired high limit.

4. In a liquid measuring device, the combination of a plurality of measuring chambers; controllable means for discharging liquid from said chambers; a header extending above said chambers and provided with downward extending liquid discharging ducts, one for each chamber, said ducts discharging a short distance below the high liquid level in the corresponding chamber; water seals for preventing the entrance of air through said ducts; and means controlled by the level of liquid in one of said chambers and serving to control the supply of liquid to said header.

5. In a liquid measuring device, the combination of a plurality of measuring chambers; controllable means for discharging liquid from said chambers; a header extending above said chambers and provided with downward extending liquid discharging ducts, one for each chamber, said ducts discharging below the maximum liquid level in the corresponding chamber; water seals for preventing the entrance of air through said ducts; a valve controlled air vent leading to the interior of said header; and means controlled by the level of liquid in one of said chambers and serving to control the supply of liquid to said header.

6. In a liquid measuring device, the combination of a plurality of measuring chambers; controllable means for discharging liquid from said chambers; a header extending above said chambers and provided with liquid discharging ducts, one for each chamber, each extending from the interior of the header near the top thereof to a point below but near the high liquid level of the corresponding chamber; and means controlled by the liquid level in one of said chambers and serving to control the supply of liquid to said header.

7. In a liquid measuring device, the combination of a plurality of measuring chambers; controllable means for discharging liquid from said chambers; a header extending above said chambers and provided with liquid discharging ducts, one for each chamber, each extending from the interior of the header near the top thereof to a point below but near the high liquid level of the corresponding chamber; water seals for preventing the entrance of air through said ducts; and means controlled by the liquid level in one of said chambers and serving to control the supply of liquid to said header.

8. In a liquid measuring device, the combination of a plurality of measuring chambers; a header connected with each of said chambers near to, but slightly below the maximum liquid level therein; means controlled by the level of liquid in one of said chambers, serving to control the supply of liquid to said manifold; manually operable means also controlling the last named flow; a plurality of flexible discharge connections leading from the bottoms of respective chambers; and a movable support constructed and arranged to shift the discharge ends of said flexible connections between two positions, one of which is above and the other below said maximum liquid level.

9. In a liquid measuring device, the combination of a plurality of measuring chambers; controllable means for discharging liquid from said chambers; a header extending above said chambers and provided with liquid discharging ducts, one for each chamber, each extending from the interior of the header near the top thereof to a point below the maximum liquid level of the corresponding chamber; a valve controlled air vent leading to the interior of said header; and means controlled by the liquid level in one of said chambers serving to control the supply of liquid to said header.

10. In a liquid measuring device, the combination of a plurality of measuring chambers; controllable means for discharging liquid from said chambers; a header extending above said chambers and provided with liquid discharging ducts, one for each chamber, each extending from the interior of the header near the top thereof to a point below the maximum liquid level of the corresponding chamber; water seals for preventing the entrance of air through said ducts; a valve controlled air vent leading to the interior of said header; and means controlled by the liquid level in one of said chambers serving to control the supply of liquid to said header.

In testimony whereof I have signed my name to this specification.

THOMAS SHIPLEY.